(12) United States Patent
Klare et al.

(10) Patent No.: US 9,405,965 B2
(45) Date of Patent: Aug. 2, 2016

(54) VECTOR-BASED FACE RECOGNITION ALGORITHM AND IMAGE SEARCH SYSTEM

(71) Applicant: NOBLIS, INC., Falls Church, VA (US)

(72) Inventors: Brendan Klare, Falls Church, VA (US); Joshua Klontz, Falls Church, VA (US); Austin Blanton, Falls Church, VA (US)

(73) Assignee: Noblis, Inc., Falls Church, VA (US)

( * ) Notice: Subject to any disclaimer, the term of this patent is extended or adjusted under 35 U.S.C. 154(b) by 0 days.

(21) Appl. No.: 14/642,458

(22) Filed: Mar. 9, 2015

(65) Prior Publication Data

US 2016/0132720 A1     May 12, 2016

Related U.S. Application Data (60) Provisional application No. 62/077,007, filed on Nov. 7, 2014.

(51) Int. Cl.
| | | |
|---|---|---|
| *G06K 9/00* | (2006.01) | |
| *G06K 9/52* | (2006.01) | |
| *G06T 7/40* | (2006.01) | |
| *G06K 9/62* | (2006.01) | |
| *G06F 17/30* | (2006.01) | |

(52) U.S. Cl.
CPC ........ *G06K 9/00288* (2013.01); *G06F 17/3028* (2013.01); *G06K 9/52* (2013.01); *G06K 9/6215* (2013.01); *G06T 7/40* (2013.01)

(58) Field of Classification Search
None
See application file for complete search history.

(56) References Cited

U.S. PATENT DOCUMENTS

| | | | | |
|---|---|---|---|---|
| 8,958,647 | B2* | 2/2015 | Irie | G06K 9/00926 382/118 |
| 9,036,917 | B2* | 5/2015 | Kaneda | G06K 9/4642 382/118 |
| 9,053,388 | B2* | 6/2015 | Ito | G06K 9/00248 |
| 2014/0043329 | A1* | 2/2014 | Wang | G06T 17/20 345/420 |
| 2014/0067679 | A1* | 3/2014 | O'Reilly | G06F 21/32 705/44 |
| 2015/0131868 | A1* | 5/2015 | Rooyakkers | G06K 9/00248 382/110 |
| 2015/0366328 | A1* | 12/2015 | Tamura | A45D 44/00 434/100 |

OTHER PUBLICATIONS

Cao et al., "Face recognition with learning-based descriptor", 2010 IEEE Conference on Computer Vision and Pattern Recognition.*

(Continued)

*Primary Examiner* — Soo Park
(74) *Attorney, Agent, or Firm* — Morrison & Foerster LLP (57) ABSTRACT

Systems and methods for performing face recognition and image searching are provided. A system for face recognition and image searching includes an ingestion system, a search system, a user device, and a database of galley files that include feature vectors. The ingestion system crawls the internet starting with a seed URL to scrape image files and generate feature vectors. Feature vectors of images input by a user may be compared by the search system to feature vectors in the gallery files. A method for generating feature vectors includes landmark detection, component aligning, texture mapping, vector computation, comparing cluster centers defined by vectors stored in a database with vectors generated based on an input image, linear discriminant analysis, and principal component analysis.

20 Claims, 7 Drawing Sheets

(56) References Cited

OTHER PUBLICATIONS

Klare et al., "Heterogeneous face recognition: matching NIR to visible light images", 2010 International Conference on Pattern Recognition.*

Oh, "Face recognition using Radial Basis Function network based on LDA", World Academy of Science, Engineering and Technology 7 2005.*

Ahonen, T. et al. (Dec. 2006). "Face Description with Local Binary Patterns: Application to Face Recognition," *IEEE Transactions on Pattern Analysis and Machine Intelligence* 28(12):2037-2041.

Belhumeur, P. N. et al. (Jul. 1997). "Eigenfaces vs. Fisherfaces: Recognition Using Class Specific Linear Projection," *IEEE Transactions on Pattern Analysis and Machine Intelligence* 19(7):711-720.

Dalal, N., et al. "Histograms of Oriented Gradients for Human Detection," *IEEE Computer Society Conference on Computer Vision and Pattern Recognition*, 2005, Montbonnot, France: 8 pages.

\* cited by examiner

VECTOR-BASED FACE RECOGNITION ALGORITHM AND IMAGE SEARCH SYSTEM

CROSS-REFERENCE TO RELATED APPLICATION

This application claims the benefit of U.S. provisional application No. 62/077,007, filed on Nov. 7, 2014 by inventor Brendan Klare, entitled "Vector-based face recognition algorithm and image search system."

FIELD OF THE INVENTION

This relates to systems and methods for face recognition and image searching.

BACKGROUND OF THE INVENTION

Images and videos are being disseminated in the open source, particularly on the internet, at an unprecedented rate. It is estimated that on average, every minute, hundreds of thousands of images are shared on social media websites alone. On YouTube, on average, over 100 hours of video comprising over 8 million images are shared every minute. This vast number of images can contain information that is highly valuable. For example, the ability to perform face recognition across the internet could be useful in finding exploited children, protecting or exploiting clandestine assets, locating war criminals, understanding criminal and terrorist networks, and other uses including but not limited to uses by the intelligence community, for cross-agency support, and in entertainment applications. Current known methods for searching images include text-based searching of "tags" that have been manually associated with particular images by humans, or searching for images that are a duplicate of an input image. Accordingly, there is a need for systems, methods, and interfaces that perform visual analytics, particularly automated face recognition, on a scale capable of processing the vast amount of image data available in the open source.

SUMMARY OF THE INVENTION

In order to perform face recognition searches on networks and on the internet, computationally-efficient and cost-effective solutions are required to accommodate the scale and rate of production of available images. Hardware and software infrastructure to crawl and scrape internet media, hardware to host search and ingestion servers and databases, and a user interface to accommodate queries are all required for an efficient and scalable system.

Methods and systems for performing visual analytics, particularly automated face recognition, on a scale capable of processing the vast amount of image data available in the open source may include a computer implemented system for ingestion of images, extraction of information from those images, and exploitation of the extracted information. Ingestion of images may be achieved by having the system crawl web pages, scrape images and videos from web pages, and detect faces in the scraped images and videos. Extraction of images may include subjecting scraped images to a face recognition algorithm that generates facial feature vectors and storing in a database data representing the generated facial feature vectors. Exploitation of the extracted information may include providing a user interface, such as a web-based user interface, that facilitates performing searches for faces that are similar to a face inputted as an image by a user.

In some embodiments, a method is performed by an ingestion system including one or more servers for enrollment and web crawling. The method is for creating a searchable database of feature vectors representing images of a faces. The method comprises receiving an image of a face; detecting landmarks on the image of the face and associating the detected landmarks with points; subjecting the points to a rigid transformation; aligning a portion of the image of the face in accordance with the rigid transformation; performing texture mapping on the portion of the image of the face; computing a first vector based on the portion of the image of the face; and creating a second vector based on a similarity of the first vector to each of a predetermined number of a first plurality of vectors. The method further comprises generating a feature vector by concatenating the second vector with a second plurality of vectors, the second vector and each of the second plurality of vectors each corresponding to a respective portion of the image of the face. The method further comprises storing the feature vector, along with associated metadata as part of a gallery file, in a database.

In some embodiments, creating the second vector includes calculating a Euclidean distance of the first vector from each of the first plurality of vectors, and includes selecting from the calculated Euclidean distances, for entry into the second vector, the predetermined number of calculated Euclidean distances that are smallest.

In some embodiments, each of the first plurality of vectors defines a center of a cluster, and each cluster comprises a third plurality of vectors computed based on a portion of a different image of a face.

In some embodiments, each of the first plurality of vectors is calculated using a radial basis function.

In some embodiments, computing the first vector and computing each of the third plurality of vectors include computing local binary patterns.

In some embodiments, computing the first vector and computing each of the third plurality of vectors include computing a histogram oriented gradient.

In some embodiments, a method comprises subjecting the feature vector to linear discriminant analysis.

In some embodiments, a method comprises subjecting the feature vector to principal component analysis.

In some embodiments, the portion of the image of the face is a component image representing a part of the face selected from the group consisting of: eyes, eyebrows, nose, mouth, and entire face.

In some embodiments, the portion of the image of the face is a rectangular sub-portion of a component image representing a part of the face selected from the group consisting of: eyes, eyebrows, nose, mouth, and entire face.

In some embodiments, receiving an image of a face comprises receiving, by a crawler, input of a seed network address. Receiving an image of a face comprises accessing, by the crawler, the seed network address. Receiving an image of a face comprises retrieving, by the crawler, an image located at the seed network address.

In some embodiments, receiving an image of a face comprises detecting, by the crawler, on a page located at the seed network address, a second network address. Receiving an image of a face comprises accessing, by the crawler, the second network address. Receiving an image of a face comprises retrieving, by the crawler, an image located at the second network address.

In some embodiments, receiving an image of a face comprises determining, by a centralized duplicate filter, whether the image has previously been retrieved. Receiving an image of a face comprises, if the image has previously been retrieved, preventing creation of the a new feature vector corresponding to the image.

In some embodiments, a method comprises associating the feature vector with an identity tag, and generating a covariance matrix based on the feature vector.

In some embodiments, a system may create a searchable database of feature vectors representing images of a faces comprises a crawler configured to retrieve an image of a face. The system comprises a centralized duplicate filter configured to preventing creation of a new feature vector if the image has previously been retrieved. The system comprises an enrollment server configured to receive the image of the face, detect landmarks on the image of the face and associate the detected landmarks with points, subject the points to a rigid transformation, align a portion of the image of the face in accordance with the rigid transformation, perform texture mapping on the portion of the image of the face, compute a first vector based on the portion of the image of the face, and create a second vector based on a similarity of the first vector to each of a predetermined number of a first plurality of vectors. The enrollment server is further configured to generate a feature vector by concatenating the second vector with a second plurality of vectors, the second vector and each of the second plurality of vectors each corresponding to a respective portion of the image of the face. The system further comprises a database configured to store the feature vector, along with associated metadata as part of a gallery file.

In some embodiments, a method is performed by a search system including one or more servers for enrollment and searching. The method is for searching a database of feature vectors representing images of faces to select resulting images of faces that are similar to an input image of a face. The method comprises receiving an image of a face, detecting landmarks on the image of the face and associating the detected landmarks with points, subjecting the points to a rigid transformation, aligning a portion of the image of the face in accordance with the rigid transformation, performing texture mapping on the portion of the image of the face, computing a first vector based on the portion of the image of the face, creating a second vector based on a similarity of the first vector to each of a predetermined number of a first plurality of vectors. The method further comprises generating a query feature vector by concatenating the second vector with a second plurality of vectors, the second vector and each of the second plurality of vectors each corresponding to a respective portion of the image of the face. The method further comprises selecting a plurality of resulting images of faces based on a comparison of the query feature vector with a plurality of feature vectors stored in gallery files in a database.

In some embodiments, selecting a plurality of resulting images comprises comparing the query feature vector to each of the plurality of feature vectors stored in gallery files, including calculating a Euclidean distance between the query feature vector and each of the plurality of feature vectors stored in gallery files. Selecting a plurality of resulting images comprises assigning each of the plurality of feature vectors stored in the gallery files a normalized similarity score based on the calculated Euclidean distance of the respective feature vector to the query feature vector.

In some embodiments, selecting a plurality of resulting images comprises transmitting the query template from a search master server to a plurality of search slave servers. Selecting a plurality of resulting images comprises transmitting, from each search slave server to the search master server, a predetermined number of candidate gallery files associated with feature vectors having highest similarity scores from among the plurality of feature vectors. Selecting a plurality of resulting images comprises transmitting, from the search master server to the enrollment server, the selected plurality of resulting images of faces, selected from the candidate gallery files based on which candidate gallery files are associated with highest similarity scores.

In some embodiments, selecting a plurality of resulting images comprises transmitting, from the search master server to the enrollment server, respective metadata and similarity scores associated with each of the selected plurality of resulting images.

In some embodiments, a system may search a database of feature vectors representing images of faces for resulting images of faces that are similar to an input image of a face. The system comprises an enrollment server configured to receive an image of a face, detect landmarks on the image of the face and associate the detected landmarks with points, subject the points to a rigid transformation, align a portion of the image of the face in accordance with the rigid transformation, perform texture mapping on the portion of the image of the face, compute a first vector based on the portion of the image of the face, and create a second vector based on a similarity of the first vector to each of a predetermined number of a first plurality of vectors. The enrollment server is further configured to generate a query feature vector by concatenating the second vector with a second plurality of vectors, the second vector and each of the second plurality of vectors each corresponding to a respective portion of the image of the face. The system further comprises a search server, coupled to a database storing feature vectors, configured to select a plurality of resulting images of faces based on a comparison of the query feature vector with a plurality of feature vectors stored in gallery files in the database.

In some embodiments, a method is performed for transmitting queries for searches of a database of feature vectors representing images of faces. The method is performed at a user device with a processor, a display, an input part, and a network communication part. The method comprises displaying an input portion for accepting query metadata. The method further comprises in response to detecting user input via the input part of query metadata to the input portion, transmitting the query metadata via the network communication part to a remote system for using the query metadata to execute a search of a database of feature vectors representing images of faces. The method further comprises receiving, via the network communication part, data representing a plurality of resulting images of faces and respective metadata and respective similarity scores associated with the respective resulting images of faces. The method further comprises displaying a results portion, wherein the results portion includes the plurality of resulting images of faces and the respective similarity scores for the displayed resulting images of faces.

In some embodiments, a method includes displaying a plurality of affordances in the results portion, each of the plurality of affordances associated with a respective one of the plurality of resulting images of faces. The method further includes, in response to detecting selection, via the input part, of one of the plurality of displayed affordances, transmitting a second query metadata via the network communication part to the remote system for using the second query metadata to execute a second search of the database of feature vectors representing images of faces.

In some embodiments, the query metadata includes a URL of an image file.

In some embodiments, a system may transmit queries for searches of a database of feature vectors representing images of faces. The system comprises a display configured to display an input portion for accepting query metadata, an input part configured to accept user input of query metadata to the input portion, and a processor configured to detect said user input of query metadata to the input portion. The system further comprises a network communication part configured to transmit the query metadata to a remote system for using the query metadata to execute a search of a database of feature vectors representing images of faces and receive data representing a plurality of resulting images of faces and respective metadata and respective similarity scores associated with the respective resulting images of faces. The display is further configured to display a results portion including the plurality of resulting images of faces and the respective similarity scores for the displayed resulting images of faces.

DETAILED DESCRIPTION OF THE INVENTION

The following description sets forth exemplary methods, parameters and the like. It should be recognized, however, that such description is not intended as a limitation on the scope of the present disclosure but is instead provided as a description of exemplary embodiments.

There is a need for systems, methods, and interfaces that perform visual analytics, particularly automated face recognition, on a scale capable of processing the vast amount of image data available in the open source. Such systems, methods, and interfaces may reduce the need for manual tagging of images and reduce the cognitive burden on a user attempting to locate images similar to an image already in the user's possession, such as other images depicting the same person's face. Such systems may allow for efficient searching of images that have been generated recently and have not yet been subject to any manual tagging by a human.

Below, FIGS. 1-5 provide a description of exemplary systems and methods for performing the techniques for face recognition and image searching disclosed herein.

Although the following description uses terms first, second, etc. to describe various elements, these elements should not be limited by the terms. These terms are only used to distinguish one element from another.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Figure 1:
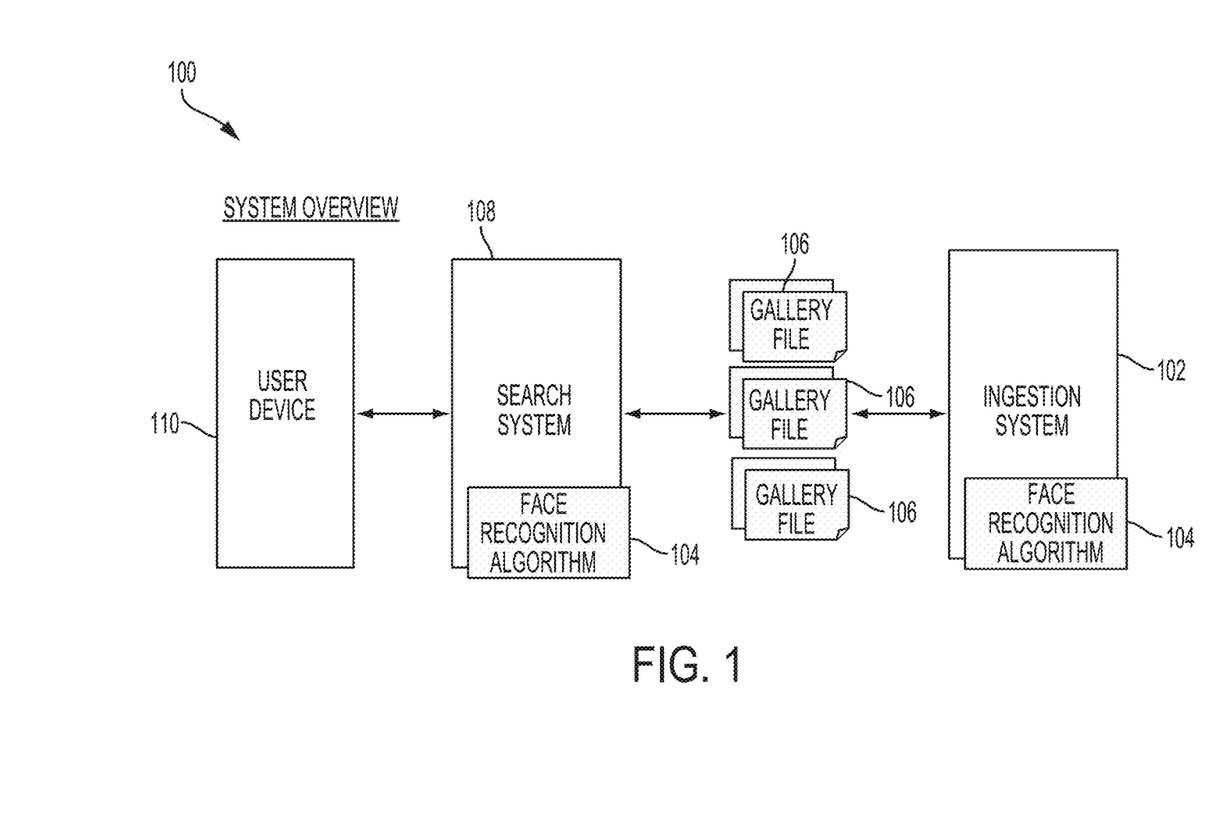
FIG. 1 is a block diagram of a face recognition and image searching system.

FIG. 1 is a block diagram illustrating exemplary components for image ingestion, face recognition analysis, and image searching in accordance with some embodiments. In some embodiments, a system 100 includes an ingestion system 102. The ingestion system 102, which will be described in greater detail below, may include one or more servers connected to a source of images and videos, the source including any public or private computer database or network, such as the internet. The ingestion system 102 includes a face recognition algorithm 104, which may be a set of instructions maintained on a non-transitory computer readable storage medium connected to one or more of the servers in the ingestion system 102. The face recognition algorithm 104, which will be explained in greater detail below, is used by the ingestion system 102 to extract feature vectors from source images and create templates to be saved in gallery files 106.

The system 100 further includes a plurality of gallery files 106 that may be stored in any suitable computer storage system or database. The gallery files 106 may include templates, which may include a feature vector. A feature vector may include a flat binary representation of a face, the representation created by application, by the ingestion system 102, of the face recognition algorithm 104 to source images. In some embodiments, the feature vector may be a 1000-dimensional vector of about 4 kilobytes. In other embodiments, the feature vector may be a 1000-dimensional vector of about 1 kilobyte. A template may further include a flat binary representation of metadata identifying the algorithm used to create the feature vector. A template may further include a location identifier, such as a URL, that identifies a source of the image used to create the feature vector. A template may further include a hash of the original image used to create the feature vector. This hash may be used in duplicate image detection, as will be described in more detail below, and to identify if an image is part of a larger image, such as one from which it was cropped. The database or computer storage system on which the gallery files 106 are stored may be connected in any suitable manner to the ingestion system 102 server(s), such that the gallery files 106 may be transferred from the ingestion system 102 to the database for storage after their creation.

The system 100 also includes a search system 108. The search system, which will be described in greater detail below, may include one or more servers, including one or more master servers and one or more slave servers, connected to the database(s) or storage system(s) containing the gallery files 106 in any suitable manner to communicate with the database(s) or storage system(s). The search system 108 includes another instance of face recognition algorithm 104, as described above with regard to ingestion system 102, connected to one or more of the servers in the search system 108. The face recognition algorithm 104, which will be explained in greater detail below, is used by the search system 108 to extract feature vectors from search images input by a user at the user device 110 for comparison against the feature vectors stored in the gallery files 106. In some embodiments, the enrollment algorithm 104 is identical in search system 108 and enrollment server 302. In some embodiments, the enrollment algorithm 104 differs between search system 108 and enrollment server 302; for example, the enrollment algorithm 104 may be optimized to run more quickly for searching purposes, while it may be optimized to run more slowly and more thoroughly for ingestion and enrollment purposes.

The system 100 also includes a user device 110, which may access a user interface such as a web-hosted interface, connected in any suitable manner to communicate with the search system 108. The device 110 may include a set of instructions maintained on a non-transitory computer readable storage medium causing the device on which the instructions are maintained to provide an interface for use by a user. The interface may facilitate input by a user of one or more image files or of one or more indications of a location, such as a URL, at which one or more image files may be found.

Figure 2:
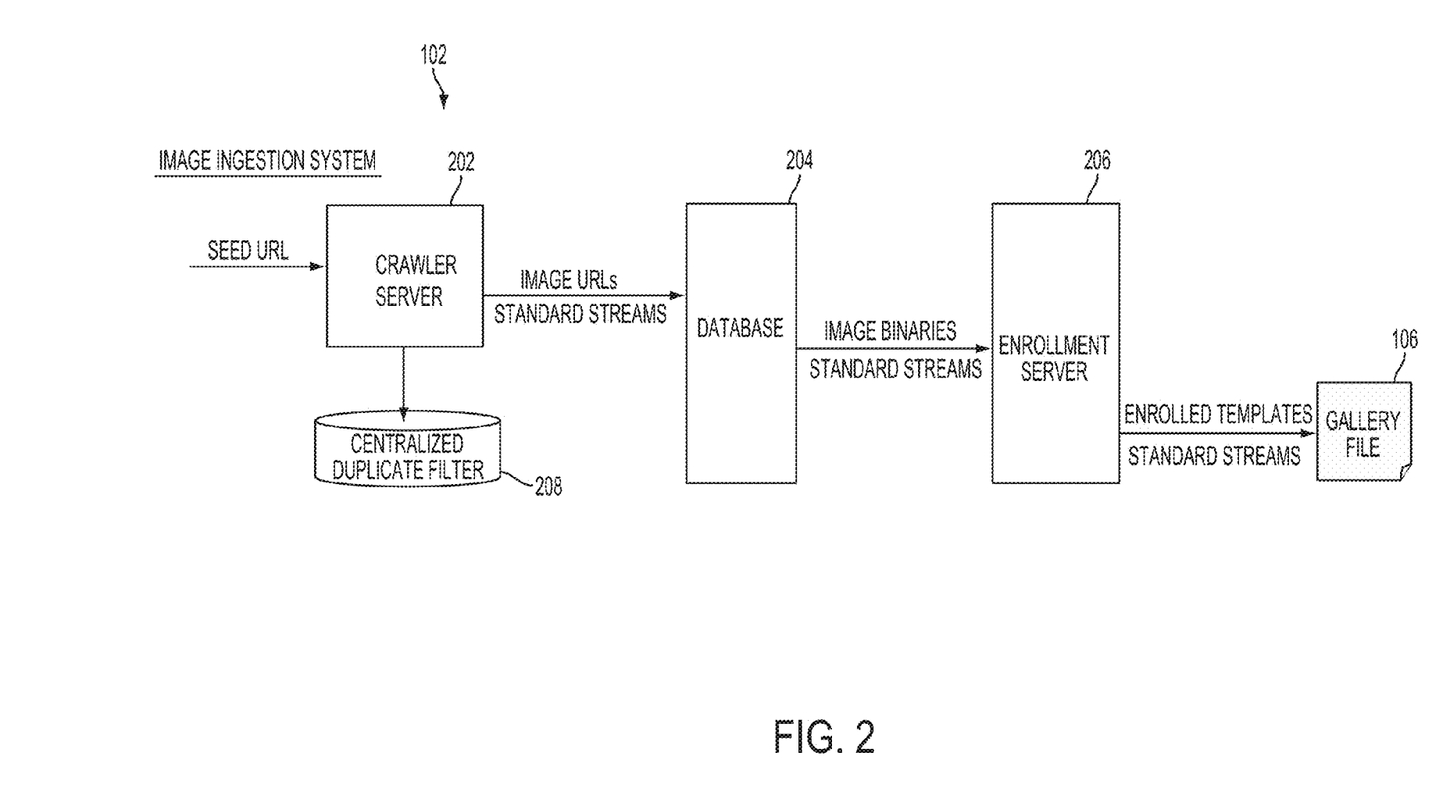
FIG. 2 is a block diagram of an ingestion system.

FIG. 2 is a block diagram illustrating exemplary components for image ingestion in accordance with some embodiments. The components of ingestion system 102 may be implemented as separate or integrated servers and databases. In some embodiments, ingestion system 102 includes one or more crawler servers 202. In some embodiments, 100 or more crawler servers 202 may be included in the system 102. The crawler servers 202 are coupled to a source of images or videos, such as any public or private computer database or network, such as the internet. The crawler servers 202 include a set of instructions maintained on a non-transitory computer readable storage medium connected to the crawler servers 202, which, when executed by a processor connected to the crawler servers 202, may cause one or more of the servers 202 to crawl image URL's based on a seed page. In some embodiments, the one or more servers 202 starts by accessing a seed page, which may be indicated by a seed URL, and then searching the page for images or videos contained on the page. An image or video that is found on the page is downloaded by a crawler server 202 and stored in a database or storage system 204 included in the ingestion system 102. The image stored in the database or storage system 204 is accessed by one or more enrollment servers 206 included in the ingestion system 102. The enrollment server 206 includes a set of instructions maintained on a non-transitory computer readable storage medium connected to the enrollment server 206, which, when executed by a processor connected to the enrollment server 206, may cause the server 206 to apply an image analytic algorithm such as face recognition algorithm 104 to the image accessed from the database 204. The face recognition algorithm 104 creates enrolled templates that include feature vectors; the enrolled templates are stored by the enrollment server in a gallery file associated with the respective image scraped by the crawler server(s) 202.

After starting with the seed page, the crawler server 202 follows all links to other network addresses, such as web URL's, located on the seed page, and reiterates the process of scraping all images from each page visited. For each page visited by the one or more crawler servers 202, the process described above is recursively performed so that every image from every page visited can be downloaded into database 204 and subject to face recognition algorithm 104 by enrollment server 206. In this manner, a gallery file 106 comprising a feature vector may be created for every suitable image located on the seed page, and for every suitable image located on pages accessible by links from the seed page. This automated process may allow the ingestion system 102 to ingest a large number of images and create a large number of gallery files, as is optimal for use by an internet-scale face recognition and image search system.

Crawler server(s) 202 are also coupled to centralized duplicate filter 208 in any suitable manner to enable communication between the components. Centralized duplicate filter 208 includes a set of instructions maintained on a non-transitory computer readable storage medium, which, when executed by a processor connected to the centralized duplicate filter 208, may cause the duplicate filter 208 to prevent ingestion by the crawler server(s) 202 of an image that is already represented in the system 100 by a gallery file 106. This technique is useful when there are multiple crawler servers 202 operating simultaneously, as the duplicate filter can prevent one crawler server 202 from ingesting an image that another crawler server 202 has previously ingested or is currently ingesting. The duplicate filter 208 may accomplish filtering by comparing the location, such as the URL, of a scraped image to the URL of other scraped images. Alternately or additionally, the duplicate filter 208 may apply primitive reverse-image-search algorithms to an image to check for an exact match to the image among images already scraped, even if the image is located at a different URL. In the event of an exact match to a previously scraped image, the ingestion system 202 stores the URL of the duplicate image and associates it as metadata with the gallery file 106 previously created for the duplicate image, but does not create a new gallery file 106 for the duplicate image.

Figure 3:
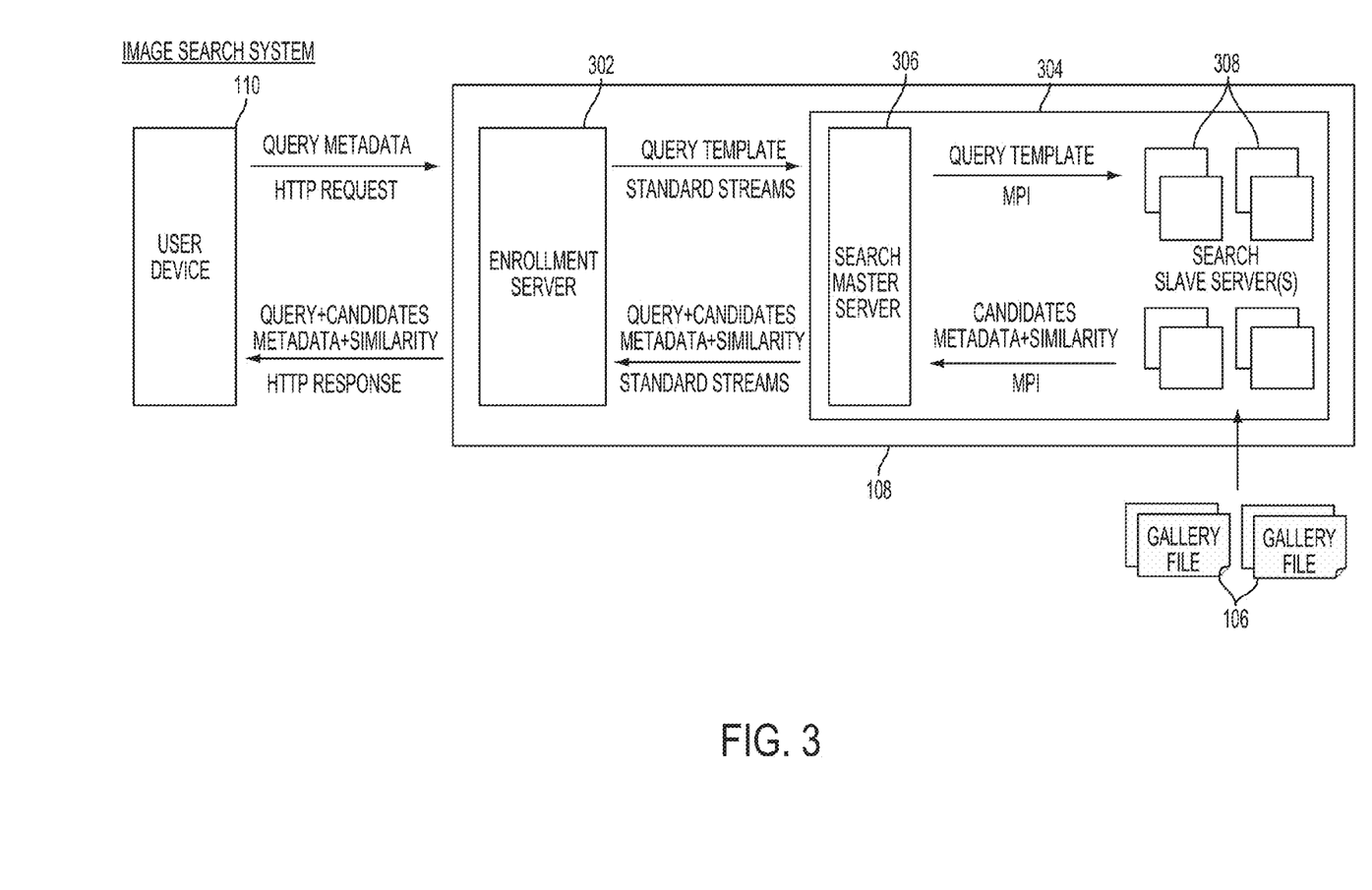
FIG. 3 is a block diagram of a search system.

FIG. 3 is a block diagram illustrating exemplary components for image searching in accordance with some embodiments. The components of search system 108 may be implemented as separate or integrated servers and databases. In some embodiments, search system 108 includes enrollment server 302. Enrollment server 302 is similar to enrollment server 206 described above with reference to FIG. 2, in that both enrollment servers apply an image analytics algorithm such as face recognition algorithm 104 to images accessed by the server 302 or 206. While enrollment server 206 applies face recognition algorithm 104 to images scraped by crawler server(s) 202, however, enrollment server 302 applies face recognition algorithm 104 to images obtained from or indicated by user device 110, which is coupled to image search system 108 in any suitable manner to allow communication between user device 110 and enrollment server 302, such as by HTTP. For example, the user device 110 transfers query metadata, such as an input URL or a local network address, to search system 108 and enrollment server 302. Search system 108 then accesses the image provided or indicated by user device 110. In some embodiments, the enrollment algorithm 104 is identical in search system 108 and enrollment server 302. In some embodiments, the enrollment algorithm 104 differs between search system 108 and enrollment server 302; for example, the enrollment algorithm 104 may be optimized to run more quickly for searching purposes, while it may be optimized to run more slowly and more thoroughly for ingestion and enrollment purposes.

Templates generated by enrollment server 302, called query templates, by the application of face recognition algorithm 104 to images provided by user device 110, are passed to one or more search servers 304. The generated templates include feature vectors generated by face recognition algorithm 104, as well as the original query metadata and image data of the query image. Search server 304 may be one server or multiple servers. In the example shown, search server 304 includes a search master server 306 and a plurality of search slave servers 308. In embodiments with multiple search slave servers 308, such as the example shown, master search server 306 may communicate with one or more slave search servers by any suitable communication means, such as MPI.

The search server 304 and search system 108 are further connected to a database or any suitable computer storage system storing galley files 106. In some embodiments, galley files 106 may be stored inside search system 108, while in other embodiments they may be stored in an external database that is communicatively connected to search system 108. In some embodiments, gallery files 106 may be stored in a random-access memory (RAM) of the search system 108.

Search servers 304 include a set of instructions maintained on a non-transitory computer readable storage medium connected to the search servers 304, which, when executed by a processor connected to the search servers 304, cause the search servers 304 to receive a query template from the enrollment server 302 and transfer the query template from the search master server 306 to a search slave server 308. The search server(s) 304 then scans of gallery templates 106 accessible by the search server(s) 304 and then applies a similarity/search algorithm, which will be described in more detail below. The similarity/search algorithm compares the query template to the templates including feature vectors stored in the gallery files 106 for close matches. The feature vector generated to represent the query image may thus be compared to the feature vectors generated to represent the images previously ingested, which are stored in the gallery files 106. Top candidate gallery files are retrieved by the search server 304. The search server 304 may retrieve a predefined number of top candidate gallery files 106. In embodiments with multiple search slave servers 308, such as the example shown, each search slave server may retrieve a predefined number of top candidate gallery files 106. The retrieved gallery files 106, including the respective associated feature vectors and metadata, are transferred from the slave search servers 308 to the search master server 306. The search server(s) 304 assigns each candidate gallery file a similarity score based on the closeness of the match. The search server(s) 304 then combines all candidate gallery files provided by any of the search slave servers 308 and selects a second predefined number of the combined candidates as results, based on which of the combined candidates have the highest/strongest score. The search server 304 then transfers the original query, the images associated with the top results, and the metadata associated with the top results back to the enrollment server 302. The similarity scores for the candidates and results are normalized by the search system 108 for presentation to the user. This normalization may be a global normalization that indicates the strength of a result as compared to the strength of other results from past or future searches.

The enrollment server 302 then transfers that data back to the user device 110, such as by HTTP. Based on the data transferred from the search system 108, the user device 110 may then display the top resulting images, respective metadata, and respective similarity scores for the query submitted.

In some embodiments, the search system 108 also causes a new gallery file 106 to be created, based on a query image submitted to the search system 108, and stored in the database of gallery files 106 that the search system 108 searches. In some embodiments, the enrollment server 302 creates a gallery file 106, in a similar manner as discussed above with reference to FIG. 2, and transmits the galley file 106 to be stored in the database. In some embodiments, the search system 108 is coupled to an ingestion system such as the ingestion system 102 discussed above with reference to FIG. 2. The search system 108 transmits data to the ingestion system 102 such that the ingestion system creates and stores a gallery file 106 based on the query image. The search system 108 may transmit the query image itself or the query metadata (which may be used as a seed URL) to the ingestion system 102 for creation of a gallery file 106.

Figure 4:
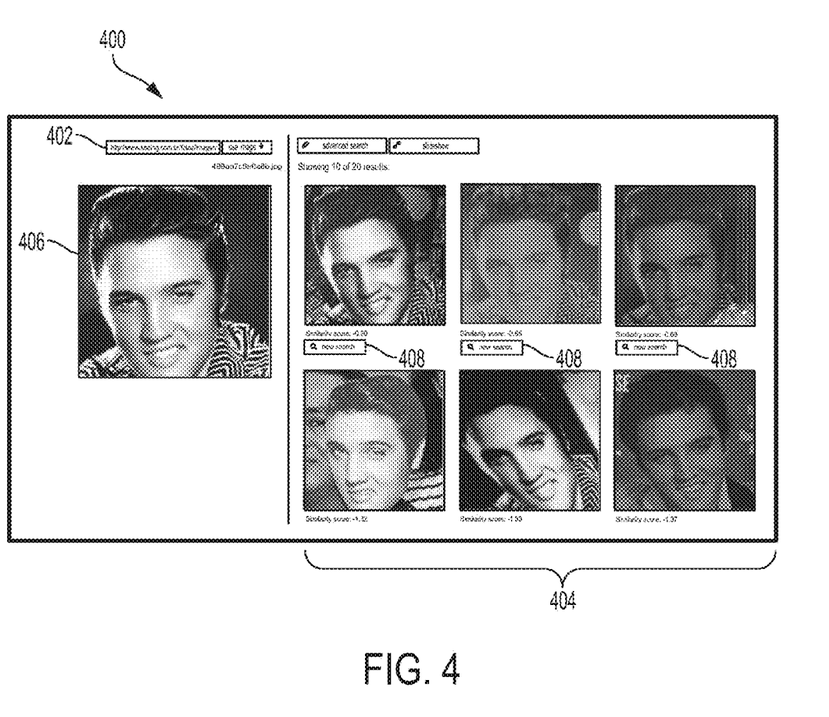
FIG. 4 is a block diagram of a user interface.

FIG. 4 is a user interface in accordance with some embodiments. In some embodiments, user interface 400 may be executed by a processor of user device 110, described with reference to FIGS. 1 and 3, and caused to be displayed on a display of user device 110. In addition to a processor, the user device 110 includes a display; an input part such as a keyboard, mouse, touch-pad, and/or touch-screen; and a network communication part such as any suitable communicative connection with which to communicate with a local or remote network such as the internet. In some embodiments, user interface 400 includes a query input portion 402 that accepts a query input from a user. A user may input, into the input portion 402, metadata such as a local file location or a URL. In response to the input of such metadata, user device 110 is caused to provide search system 302 with the image file and/or the metadata itself, such that the search system 302 accesses and enrolls the image as described above with reference to FIG. 3. User interface 400 further includes results portion 404, which displays the resulting images and associated scores and associated metadata returned by search system 302 as described above with reference to FIG. 3. User interface 400 further includes query image 406, which displays the query image that the user has indicated in the input portion 402. User interface 100 further includes new search affordances 408, which provide the user with a displayed selectable interface (e.g., a displayed option, such as a button) associated with submitting a respective returned result image as the input image for a new query. A respective new search affordance 408 may be displayed alongside each respective returned result in the results portion 404.

Face-Recognition Method

Figure 5A:
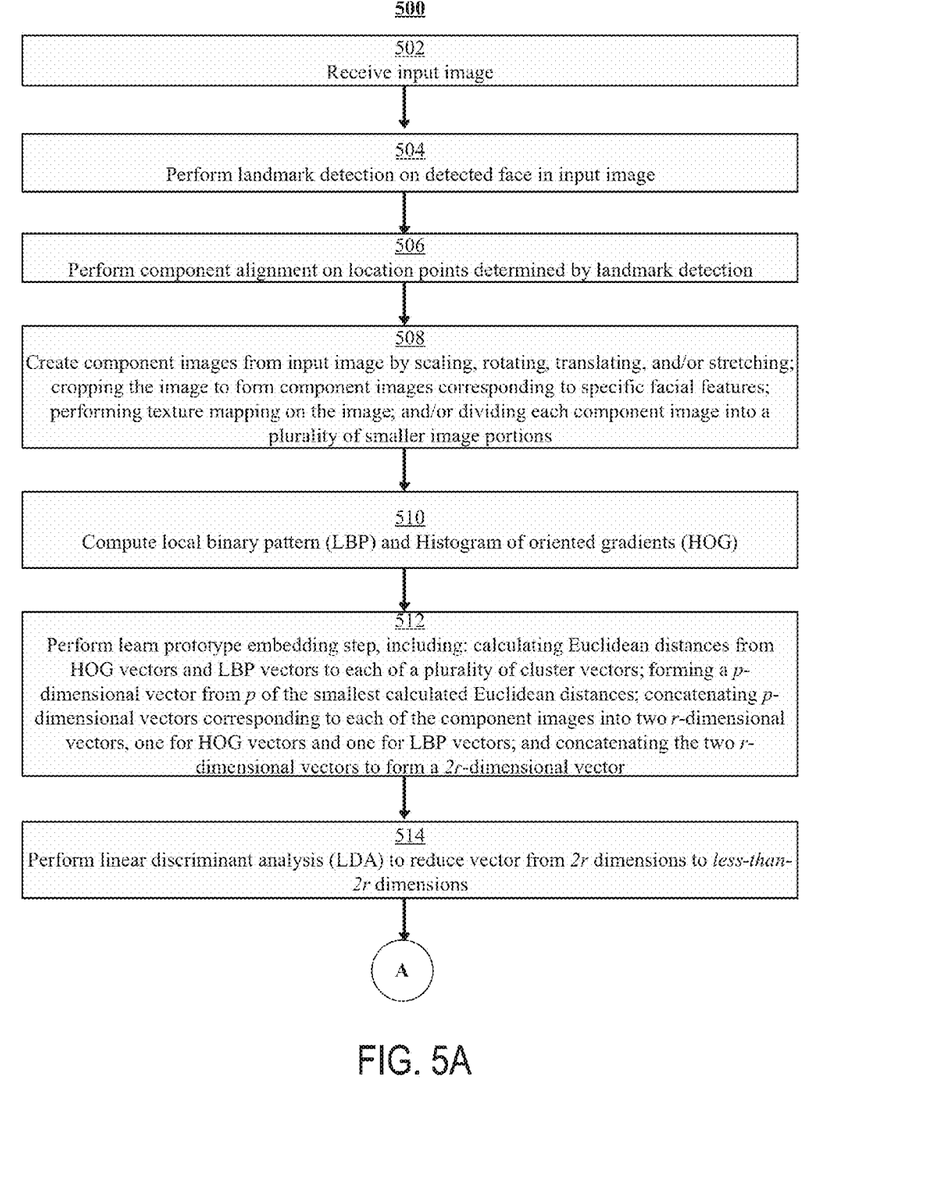
FIGS. 5A-5C are flow diagrams depicting a method for face recognition.
Figure 5B:
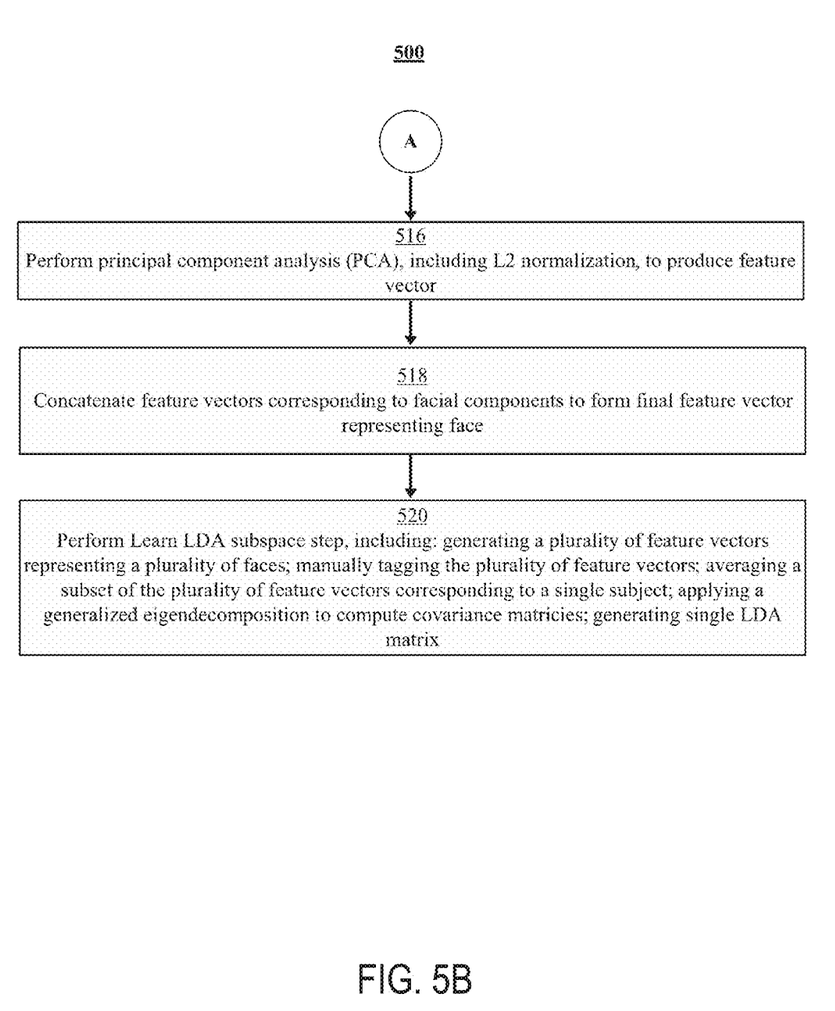
Figure 5C:
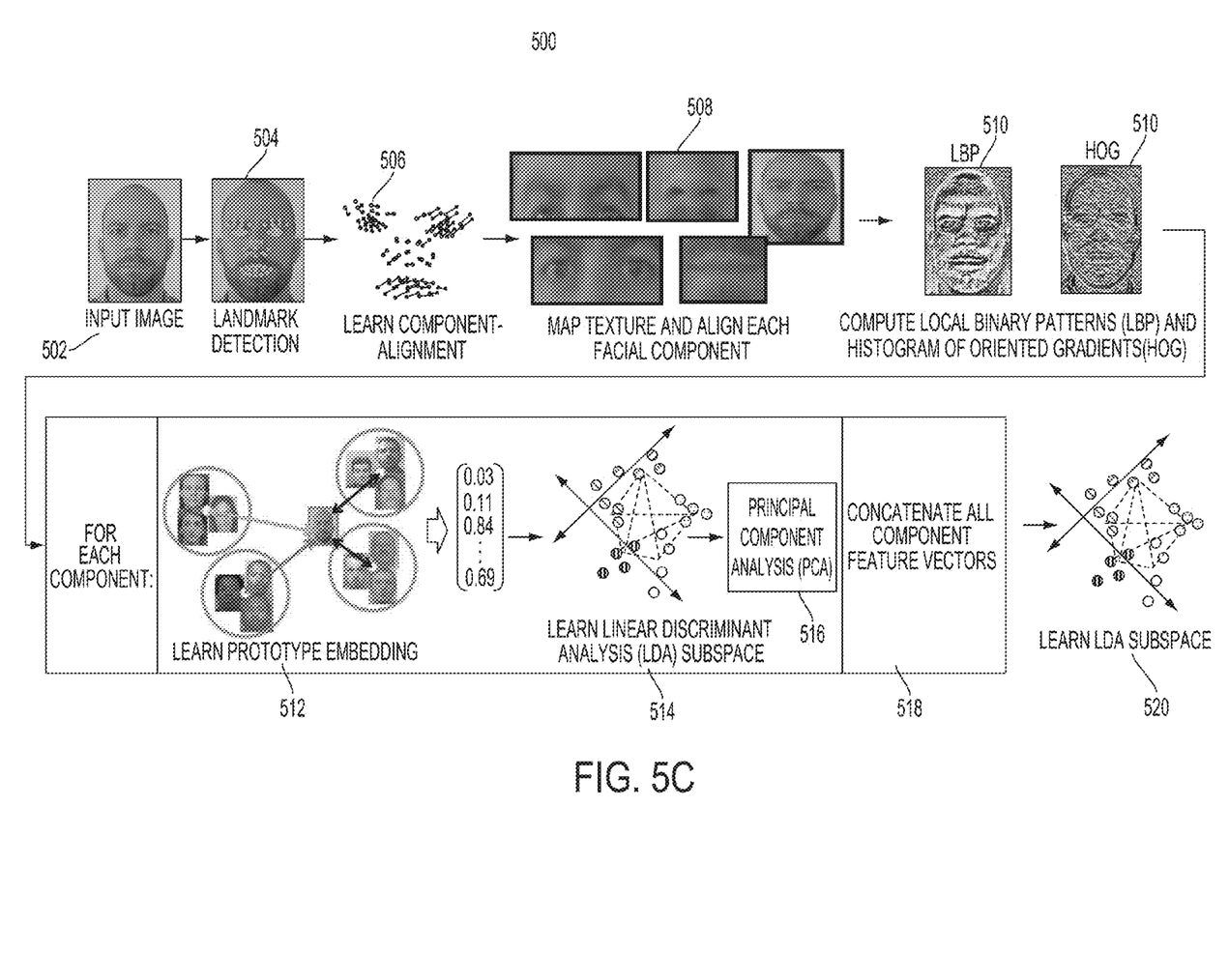

FIGS. 5A-5C represent a method for face recognition in accordance with some embodiments. FIGS. 5A and 5B show a flow diagram depicting steps of a method in accordance with some embodiments, and FIG. 5C is an illustrated representation of the steps of the method in accordance with some embodiments. Herein, reference will be made to steps 502-520. These references may be understood to refer to the steps depicted in FIG. 5A and/or FIG. 5B. The method 500 may be performed by a system such as the system 100 described above with reference to FIG. 1. The method 500 includes receiving an input image (502). The input image may be received by a search system 108 from a user device 110 or retrieved from the internet or any other computer network or computer database, based on a URL or a resource locator, which may itself be provided by a user device 110. In some embodiments the image may be received from a crawler server 202 as described above. The input image may be subject to a face detection algorithm executed by search system 108 to detect the presence and location of faces in the image.

When a face is detected in the image, the image (or a portion of the image in which a face has been detected) is then subject to landmark detection (504). Landmark detection analyzes the image to detect the presence and location of key facial features such as eyes, nose, mouth, and eyebrows. Each facial feature is associated with various location points indicating the location of facial landmarks in the image, as shown in FIG. 5 at step 504.

A component alignment is then performed on the various location points (506). Component alignment may include subjecting the location points to a rigid transformation, such as a rotation, translation, or scaling. The transformation applied to the location points may be a Procrustes alignment. The component alignment or Procrustes alignment applied to the location points may be based on a predetermined ideal facial feature layout. The predetermined ideal facial feature layout may be determined based on taking the average of a large number of images of faces, subjecting the images to landmark detection, and averaging the location of corresponding landmark locations across all of the images. The images used to predetermine the ideal facial feature layout may be images obtained from an ingestion system such as ingestion system 102 described above. Accordingly, the predetermined ideal facial layout may be dynamically updated as the ingestion system ingests additional and/or newly available images.

The input image is then used to create several component images (508). The component images are obtained by manipulating the input image in accordance with the transformation performed in the component alignment step. That is, the rigid transformation applied to the landmark location points is used to align and manipulate the input image, including scaling, rotating, translating, or stretching it. The input image also may be cropped in accordance with predefined groupings of landmark location points corresponding to individual facial features. The resulting aligned, manipulated, and cropped component images are subject to texture mapping, such as barycentric texture mapping. In some embodiments, performing barycentric texture mapping on each component image includes dividing each component image into a plurality of smaller portions that together constitute the entire component image, such as a grid of small squares or rectangles. The barycentric texture mapping may then be performed individually on each smaller portion.

For each component image or for each smaller portion of each component image, after the texture mapping is performed, a local binary pattern (LBP) and histogram of oriented gradients (HOG) are both computed (510). As a result of the LBP and HOG computations, for each portion of a component image on which the computation is performed, a numeric data output is generated. In some embodiments, for the LBP computation, the output is a 59-dimensional vector. In some embodiments, for the HOG computation, the output is a 108-dimensional vector. In some embodiments, other representations different from LBP and HOG may be used to create a vector representation of each smaller portion of each component image.

For each vector generated as output data by the LBP and HOG computations (corresponding to respective portions of the component images), a learn prototype embedding step is then performed (512). This step includes calculating an n-dimensional Euclidean distance between each n-dimensional vector generated based on the component image or on the smaller portions thereof and each of a plurality of n-dimensional cluster vectors generated based on images of other faces.

Cluster vectors may be generated based on a center or average of a "cluster" of other individual vectors. To define a cluster of individual vectors, a plurality of vectors are generated, in the manner discussed above with regard to step 510, by HOG or LBP computations performed on a plurality of portions of component images of various faces. This plurality of vectors is stored in a database that is part of a system such as the system 100 discussed above with regard to FIG. 1. The plurality of stored vectors are then analyzed by the system to determine subsets of the plurality of vectors, wherein the vectors in each subset have similar values. For example, a cluster of vectors may be recognized by determining subsets of the plurality of vectors in which the vectors in the subset have small n-dimensional Euclidean distances from one another relative to their distances from other vectors in the overall available plurality of vectors. Each subset of the plurality of vectors is defined as a "cluster," as they may be thought of as clustered together, nearby to one another, in n-dimensional vector space. A vector that represents the center or average of each cluster is then generated. This may be accomplished, for example, by using a radial basis function. The vectors defining the center of each respective cluster constitute the n-dimensional cluster vectors that are used to calculate an n-dimensional Euclidean distance from the n-dimensional vector generated as output by the LBP and HOG computations performed in step 510.

The n-dimensional Euclidean distance calculation of step 512 is performed for every cluster vector stored in the system 100 for each vector generated in step 510. In some embodiments, the number of smaller portions into which a component image is divided may be determined by the system based on the size of the component image, the resolution of the component image, the shape of the component image, and the type (facial feature) of the component image. In some embodiments, the system 100 may divide a component image into about 40 smaller portions, generating an n-dimensional vector for each image for each such portion. In some embodiments of the system 100, about 10,000 clusters may be defined. Thus, step 512 may involve performing about 400,000 Euclidean distance calculations for each component image. The system 100 may be scaled to contain any number of gallery files 106 and to define a larger number of clusters, and this number of calculations could increase accordingly.

From the total number of n-dimensional Euclidean distances calculated for each portion of each component image, a predetermined number p of the smallest of said distances are selected and used to form a p-dimensional vector. It should be noted that the set of smallest Euclidean distances is determined independently for each patch and independently with regard to each patch's LBP and HOG data. Thus, the Euclidean distances selected for the p-dimensional vector may correspond to different clusters for each patch and with respect to each patch's LBP and HOG data. The predetermined number p of distances may be varied, but in some embodiments it may be set to five. In accordance with those embodiments, the five smallest n-dimensional Euclidean distances are selected from the total set of Euclidean distances calculated, and those five Euclidean distances are used to create a five-dimensional vector. Because this step 512 is performed once for the LBP vectors and once for the HOG vectors, this step 512 generates two p-dimensional vectors, such as two five-dimensional vectors, for each smaller portion of each component image.

The two sets (one set for LBP, one set for HOG, one vector in each set corresponding to each smaller portion of the component image) of p-dimensional vectors generated for each component image are then concatenated into two vectors each being of dimension (p*q)=r, where q is the number of smaller portions into which the component image was divided. Additionally, concatenation is performed across the sets of generated vectors corresponding to the LBP data and corresponding to the HOG data. Accordingly, a vector of dimension 2r is generated For example, if a component image was divided into 40 smaller portions, and two sets (one each for HOG and LBP) of 40 five-dimensional vectors were generated, then a final concatenated 400-dimensional vector corresponding to the entire component image would be generated.

The resulting 2r-dimensional vectors are then subjected to a technique for dimensionality reduction (514). In some embodiments, the technique for dimensionality reduction is linear discriminant analysis (LDA). The linear discriminant analysis dimensionality reduction may be performed by using an LDA matrix, such as an LDA matric calculated as explained below with reference to step 520. In step 514, the 2r-dimensional vectors are accordingly reduced to vectors of fewer dimensions than 2r.

The vectors resulting from the LDA in step 514 are then further subjected to principal component analysis (PCA)

(516). This step may also involve the application of an L2 normalization. The result of step 516 is the production of a feature vector of fewer dimensions than 2r.

The feature vectors (of fewer dimensions than 2r) generated in step 516 with respect to each different component image are then concatenated (518) to create a final feature vector representing all component images of the entire input image of a face. That is, the feature vectors generated with respect to each component image of a single image of a face are concatenated into a single feature vector representative of the entire image of a face.

In some methods for training a facial recognition system, the feature vectors generated in step 518 may be subject to a Learn LDA subspace step (520). In this step, a plurality of feature vectors are generated (with respect to a plurality of faces) for purposes of training the system. By using identity tags (indicating that an image is of a particular person's face) that are manually associated with each of the plurality of training images, the average of all feature vectors for each given subject (each given person) is calculated. A generalized eigendecomposition is applied to compute two covariance matrices, including one "within-class" covariance matrix and one "between-class" covariance matrix. Optimally, the within-class covariance matrix will represent a high degree of similarity between all feature vectors generated for images of a given subject, while the between-class covariance matrix will represent a low degree of similarity (a high degree of variance) between feature vectors generated for images of different subjects. A single LDA matrix may be generated by step 520, and the single LDA matrix may be used, in some embodiments, in performing the linear discriminant analysis dimensionality reduction process described above with reference to step 514.

In some embodiments for comparing two images of faces directly, including the search system 108 discussed above, a feature vector as generated in step 518 may be compared to the feature vector generated for another image of a face. This comparison is achieved by calculating the Euclidean distance between the two feature vectors that are being compared. The shorter the Euclidean distance, the more similar the faces in the two images; the larger the Euclidean distance, the less similar the faces in the two images. In systems such as the search system 108 explained above, such a comparison may be made recursively with respect to the feature vector generated representing a single input image of a face, and successively comparing that feature vector to a plurality of other feature vectors stored in a database may be used as a method to find the most similar feature vector associated with the most similar image of a face to the input image.

A similarity score representing the comparison of two feature vectors is generated. The similarity score may be based on the Euclidean distance between the two feature vectors. The similarity score may be scaled in any suitable manner. For example, the similarity score may be scaled according to a predetermined scaling factor. Alternately or additionally, the similarity score may be scaled in a variable manner that accounts for the relative similarity scores or relative Euclidean distances calculated with respect to other images in a database.

Example 1

In one example, 100 c3.large Amazon EC2 instances were used to crawl the internet to scrape images and ingest them into a system. In 24 hours, 34,795,552 unique URL's were processed and 5,473,414 face templates were extracted. The total cost of this process was $256. Searching the images ingested by this process in accordance with the method described above using the query image shown in FIG. 4 resulted in the results shown in FIG. 4 in the results portion 404.

Example 2

In a future embodiment of the system and method described herein, over one billion images of faces are ingested into the system. According to the methods described above, the ingestion of one billion images of faces is completed in 15 days, and searches of the one-billion-face database are performed in one second. Other computer vision algorithms, including auto-scene tagging algorithms and object recognition algorithms, are integrated into the system. The system is capable of large-scale clustering, including detecting groups of correlated faces, and graph analysis for knowledge discovery.

What is claimed is:

1. A method, performed by an ingestion system including one or more servers for enrollment and web crawling, for creating a searchable database of feature vectors representing images of a faces, the method comprising:
   receiving an image of a face;
   detecting landmarks on the image of the face and associating the detected landmarks with points;
   subjecting the points to a transformation;
   aligning a portion of the image of the face in accordance with the transformation;
   performing texture mapping on the portion of the image of the face;
   computing a first vector based on the portion of the image of the face;
   creating a second vector based on a similarity of the first vector to each of a predetermined number of a first plurality of vectors;
   generating a feature vector by concatenating the second vector with a second plurality of vectors, wherein the second vector and each of the second plurality of vectors each correspond to a respective portion of the image of the face; and
   storing the feature vector, along with associated metadata as part of a gallery file, in a database.

2. The method of claim 1, wherein creating the second vector includes:
   calculating a distance of the first vector from each of the first plurality of vectors, and
   selecting from the calculated distances, for entry into the second vector, the predetermined number of calculated distances that are smallest.

3. The method of claim 2, wherein each of the first plurality of vectors defines a center of a cluster, each cluster comprising a third plurality of vectors computed based on a portion of a different image of a face.

4. The method of claim 3, wherein each of the first plurality of vectors is calculated using a radial basis function.

5. The method of claim 3, wherein computing the first vector and computing each of the third plurality of vectors include computing local binary patterns.

6. The method of claim 3, wherein computing the first vector and computing each of the third plurality of vectors include computing a histogram oriented gradient.

7. The method of claim 1, comprising:
   subjecting the feature vector to linear discriminant analysis.

8. The method of claim 1, comprising:
   subjecting the feature vector to principal component analysis.

9. The method of claim 1, wherein the portion of the image of the face is a component image representing a part of the face selected from the group consisting of: eyes, eyebrows, nose, mouth, and entire face.

10. The method of claim 1, wherein the portion of the image of the face is a rectangular sub-portion of a component image representing a part of the face selected from the group consisting of: eyes, eyebrows, nose, mouth, and entire face.

11. The method of claim 1, wherein receiving an image of a face comprises:
   receiving, by a crawler, input of a seed network address,
   accessing, by the crawler, the seed network address, and
   retrieving, by the crawler, an image located at the seed network address.

12. The method of claim 11, wherein receiving an image of a face further comprises:
   detecting, by the crawler, on a page located at the seed network address, a second network address,
   accessing, by the crawler, the second network address, and
   retrieving, by the crawler, an image located at the second network address.

13. The method of claim 11, wherein receiving an image of a face further comprises:
   determining, by a duplicate filter, whether the image has previously been retrieved, and
   if the image has previously been retrieved, preventing creation of the a new feature vector corresponding to the image.

14. The method of claim 1, comprising:
   associating the feature vector with an identity tag;
   generating a covariance matrix based on the feature vector.

15. A system for creating a searchable database of feature vectors representing images of faces, comprising:
   a crawler configured to retrieve an image of a face;
   a duplicate filter configured to prevent creation of a new feature vector if the image has previously been retrieved;
   an enrollment server configured to:
   receive an image of a face;
   detect landmarks on the image of the face and associate the detected landmarks with points,
   subject the points to a transformation,
   align a portion of the image of the face in accordance with the transformation,
   perform texture mapping on the portion of the image of the face,
   compute a first vector based on the portion of the image of the face,
   create a second vector based on a similarity of the first vector to each of a predetermined number of a first plurality of vectors, and
   generate a feature vector by concatenating the second vector with a second plurality of vectors, wherein the second vector and each of the second plurality of vectors each correspond to a respective portion of the image of the face; and
   a database configured to store the feature vector, along with associated metadata as part of a gallery file.

16. A method, performed by a search system including one or more servers for enrollment and searching, for searching a database of feature vectors representing images of faces to select resulting images of faces that are similar to an input image of a face, comprising:
   receiving an image of a face;
   detecting landmarks on the image of the face and associating the detected landmarks with points;
   subjecting the points to a transformation;
   aligning a portion of the image of the face in accordance with the transformation;
   performing texture mapping on the portion of the image of the face;
   computing a first vector based on the portion of the image of the face;
   creating a second vector based on a similarity of the first vector to each of a predetermined number of a first plurality of vectors;
   generating a query feature vector by concatenating the second vector with a second plurality of vectors, wherein the second vector and each of the second plurality of vectors each corresponds to a respective portion of the image of the face and;
   selecting a plurality of resulting images of faces based on a comparison of the query feature vector with a plurality of feature vectors stored in gallery files in a database.

17. The method of claim 16, wherein selecting a plurality of resulting images comprises:
   comparing the query feature vector to each of the plurality of feature vectors stored in gallery files, including calculating a distance between the query feature vector and each of the plurality of feature vectors stored in gallery files, and
   assigning each of the plurality of feature vectors stored in the gallery files a normalized similarity score based on the calculated distance of the respective feature vector to the query feature vector.

18. The method of claim 16, wherein selecting a plurality of resulting images comprises:
   transmitting the query template from a search master server to a plurality of search slave servers,
   transmitting, from each search slave server to the search master server, a predetermined number of candidate gallery files associated with feature vectors having highest similarity scores from among the plurality of feature vectors, and
   transmitting, from the search master server to the enrollment server, the selected plurality of resulting images of faces, selected from the candidate gallery files based on which candidate gallery files are associated with highest similarity scores.

19. The method of claim 18, wherein selecting a plurality of resulting images comprises:
   transmitting, from the search master server to the enrollment server, respective metadata and similarity scores associated with each of the selected plurality of resulting images.

20. A system for searching a database of feature vectors representing images of faces for resulting images of faces that are similar to an input image of a face, comprising:
   an enrollment server configured to:
   receive an image of a face,
   detect landmarks on the image of the face and associate the detected landmarks with points,
   subject the points to a transformation,
   align a portion of the image of the face in accordance with the transformation,
   perform texture mapping on the portion of the image of the face,
   compute a first vector based on the portion of the image of the face,
   create a second vector based on a similarity of the first vector to each of a predetermined number of a first plurality of vectors, and
   generate a query feature vector by concatenating the second vector with a second plurality of vectors, wherein the second vector and each of the second plurality of vectors each correspond to a respective portion of the image of the face; and a search server, coupled to a database storing feature vectors, configured to:
select a plurality of resulting images of faces based on a comparison of the query feature vector with a plurality of feature vectors stored in gallery files in the database.

* * * * *